(12) United States Patent
Tung et al.

(10) Patent No.: US 6,673,241 B1
(45) Date of Patent: Jan. 6, 2004

(54) SELF-FLOATING COVER SYSTEM FOR A BODY OF WATER

(75) Inventors: Albert E. Tung, Chesterfield, MO (US); Brent A. Roberts, Spencer, IA (US)

(73) Assignee: Monsanto Company, St. Louis, MO (US)

( * ) Notice: Subject to any disclaimer, the term of this patent is extended or adjusted under 35 U.S.C. 154(b) by 38 days.

(21) Appl. No.: 09/844,498

(22) Filed: Apr. 27, 2001

Related U.S. Application Data

(60) Provisional application No. 60/201,977, filed on May 3, 2000.

(51) Int. Cl.$^7$ .................................................. C02F 1/40
(52) U.S. Cl. .................................. 210/242.1; 210/242.4
(58) Field of Search ............................... 210/615–619, 210/242.1, 242.4

(56) References Cited

U.S. PATENT DOCUMENTS

| | | | |
|---|---|---|---|
| 3,517,513 A | | 6/1970 | Renshaw et al. |
| 3,540,415 A | | 11/1970 | Bromley |
| 3,592,009 A | | 7/1971 | Glijnis et al. |
| 3,683,428 A | | 8/1972 | Morris |
| 3,815,367 A | | 6/1974 | Collins et al. |
| 3,867,250 A | * | 2/1975 | Jankowiak et al. ......... 428/543 |
| 3,883,909 A | * | 5/1975 | Fisher et al. ................ 114/352 |
| 3,933,628 A | | 1/1976 | Varani |
| 4,046,091 A | * | 9/1977 | Lomas et al. ............... 114/355 |
| 4,066,400 A | | 1/1978 | Cox et al. |
| 4,135,257 A | | 1/1979 | Löf |
| 4,137,575 A | | 2/1979 | Klaffke et al. |
| 4,169,050 A | | 9/1979 | Serfling et al. |
| 4,169,791 A | | 10/1979 | Johnson, Jr. et al. |
| 4,192,025 A | | 3/1980 | Hinsperger |
| 4,197,595 A | | 4/1980 | Dearing |
| 4,209,388 A | | 6/1980 | DeFraites |
| 4,312,152 A | | 1/1982 | Drury et al. |
| 4,374,629 A | | 2/1983 | Garrett |
| 4,437,786 A | | 3/1984 | Morrisroe |
| 4,490,071 A | | 12/1984 | Morrisroe |
| 4,534,675 A | | 8/1985 | Morrisroe |
| 4,559,240 A | * | 12/1985 | Herbert, Jr. ................. 427/140 |
| 4,621,587 A | * | 11/1986 | Pool ............................ 114/343 |
| 4,678,368 A | | 7/1987 | Helversen |
| 4,735,524 A | | 4/1988 | Dunkers |
| 4,778,856 A | | 10/1988 | Chen et al. |
| 4,898,111 A | * | 2/1990 | Hackney ...................... 114/108 |
| 5,035,536 A | | 7/1991 | von Winckelmann |
| 5,067,182 A | | 11/1991 | Koelsch |
| 5,096,577 A | | 3/1992 | Ngo et al. |
| 5,216,976 A | | 6/1993 | Marinkovich |
| 5,256,281 A | | 10/1993 | Ngo et al. |
| 5,259,697 A | | 11/1993 | Allen et al. |
| 5,264,127 A | | 11/1993 | Ngo et al. |
| 5,265,976 A | | 11/1993 | Russell |

(List continued on next page.)

FOREIGN PATENT DOCUMENTS

WO    WO 99/17605    4/1999

OTHER PUBLICATIONS http://www.bei–ec.com/html/biocap.html.*
http://www.bei–ec.com/html/bioinfo.html.*
Clanton, C.J., et al., "Swine Manure Storage Covers For Odor Control", *Applied Engineering in Agriculture*, 1999, vol. 15(5), pp. 567–572.

(List continued on next page.)

*Primary Examiner*—Chester T. Barry
(74) *Attorney, Agent, or Firm*—Senniger, Powers, Leavitt & Roedel

(57) ABSTRACT

The present invention is directed to a foldable, self-floating cover system for a body of water. This invention is also directed to a method of using this cover on a body of water, and particularly on a sewage lagoon to reduce the emission of offensive odors and/or gases.

41 Claims, 2 Drawing Sheets

U.S. PATENT DOCUMENTS

| | | | |
|---|---|---|---|
| 5,269,634 A | | 12/1993 | Chynoweth et al. |
| 5,313,907 A | * | 5/1994 | Hodges ..................... 114/219 |
| 5,400,549 A | | 3/1995 | Morgan |
| 5,409,601 A | | 4/1995 | Ngo et al. |
| 5,546,615 A | | 8/1996 | Chamness |
| 5,562,759 A | | 10/1996 | Morgan et al. |
| 5,593,575 A | | 1/1997 | Cretini |
| 5,639,657 A | | 6/1997 | Saiki et al. |
| 5,652,972 A | | 8/1997 | Chartrand |
| 5,860,413 A | | 1/1999 | Bussey, Jr. et al. |
| 5,861,095 A | | 1/1999 | Vogel et al. |
| 6,136,194 A | * | 10/2000 | Vogel et al. ................ 210/605 |
| 2002/0008057 A1 | * | 1/2002 | Baumgartner et al. ...... 210/170 |

OTHER PUBLICATIONS

Freese, B., "Manure Storage Covers", reprinted from *Successful Farming,* Sep. 1998, pp. 747–1 to 747–2.

Jacobson, L., "Do Covers Work on Lagoons?", *Minnesota Pork Journal* 8(1), Published in Minnesota Pork News, 1998, pp. 10–12.

Mannebeck, H., "Covering Manure Storing Tanks To Control Odour", *Odour Prevention and Control of Organic Sludge and Livestock Farming,* 1985, pp. 188–193, Elsevier Applied Science Publishers, London, England.

Miner, J.R. et al., "A Floating Permeable Blanket To Prevent Odor Escape", *Proc. Int. Livestock Odor Conf.* '95, 1995, pp. 28–34, Iowa State University College of Agriculture, Ames, Iowa.

NPPC Swine Odor & Emissions From Pork Production Module, "Swine Odor & Emissions From Pork Production", pp. 92–95.

Scott, S., et al., "Answers To Questions Commonly Asked About AquaMats™", Memorandum dated Jan. 2, 1998, Meridian Applied Technology Systems USA, LLC.

"Amoco Nonwoven Geotextiles Technical Specifications", Nilex Product Specification, undated.

"Technical Specifications", Typar® Landscape Products, 2000.

"Typar® Spunbonded Polypropylene", Typar, 1991.

"Microfoam® Polypropylene Sheet Foam", Pactiv Corporation, product information sheet, 1999.

"Ultra Weave ™ Technology", Meridian Aquatic Technology, LLC.

"Foam Protection" product information sheet, Tenneco Packaging.

* cited by examiner

SELF-FLOATING COVER SYSTEM FOR A BODY OF WATER

This application claims the benefit of U.S. provisional application Ser. No. 60/201,977, filed May 3, 2000, the disclosure of which is expressly incorporated herein by reference.

FIELD OF THE INVENTION

This invention generally relates to a cover for a body of water (e.g., lagoons, ponds and the like), and particularly relates to a cover for anaerobic sewage lagoons (particularly agricultural sewage lagoons) to reduce odors and emissions of ammonia, hydrogen sulfide and/or volatile organic compounds from such lagoons into the environment.

BACKGROUND OF THE INVENTION

Agricultural sewage lagoons may extend over large areas (e.g., several hectares) and often produce, for example, various odor, ammonia ($NH_3$), hydrogen sulfide ($H_2S$) and/or volatile organic compound (VOC) emission problems. Numerous attempts have been made to reduce such odor and gas emissions.

Clanton et al. (in C. J. Clanton, D. R. Schmidt, L. D. Jacobson, R. E. Nicolai, P. R. Goodrich, K. A. Janni, "Swine Manure Storage Covers for Odor Control," *Applied Engineering in Agriculture*, Vol. 15(5), pp. 567–72 (1999)) disclose six alternative cover treatments for reducing odors from agricultural sewage lagoons: a straw mat, a vegetable oil mat, a mat formed from a combination of vegetable oil and straw, a clay ball mat, a PVC/rubber membrane (PERMALON, Reef Industries, Inc., Houston, Tex. U.S.A.) composed of high density polyethylene and supported on STYROFOAM floats sewn into pockets at the periphery of the membrane and a self-floating cover consisting of a paper thin (0.3 mm) "geotextile membrane" (TYPAR 3201C, DuPont Geotextiles North America, Nashville, Tenn., U.S.A.) composed of thermally bonded, continuous polypropylene filaments. Clanton et al. report that all six alternatives reduced odors and hydrogen sulfide emitted from swine sewage tanks. None of these alternatives, however, are entirely satisfactory. The straw mat, for example, deteriorates over time and also sinks during periods of heavy rain. The vegetable oil mat, on the other hand, produces a "distinctively offensive non-swine odor" and is not recommended as a cover. The clay ball mat did not perform as well as expected and is the least effective alternative for reducing emissions. Clanton et al. speculate that these results may stem from differences in clay ball materials, types and sizes. Although Clanton et al. report that the PVC/rubber membrane consistently reduces both odors and hydrogen sulfide, such a cover is disadvantageous because it is not self-floating (i.e., it requires STYROFOAM supports to stay afloat). Clanton et al. report that odor reduction by the "geotextile membrane" is minimal. Nevertheless, Clanton et al. speculate that such a mat would be more effective over time if a thick biofilm is allowed to grow on the upper surface of the membrane to an extent sufficient to produce a seal to prevent odors and gases from escaping from the lagoon into the environment. Clanton et al., however, fail to recognize that such a self-sealed cover tends to collect rain water and will ultimately sink during periods of heavy rain. This disadvantage also would tend to occur with the PVC/rubber membrane cover. In addition, such a self-sealed geotextile cover and the PVC/rubber membrane cover tend to only delay at least some of the offensive odors and gases from escaping from the lagoon; these gases would simply tend to collect between the cover and the lagoon surface, thereby causing gas bubbles under the cover and ultimate emission of the offensive odors and gases, for example, at the edges of the cover. In addition, it is difficult to remove dead biomass from the geotextile and PVC/rubber covers.

Betsy Freese (in B. Freese, "Manure Storage Covers," Successful Farming, September, 1997) also summarizes a variety of alternative covers for reducing odors from agricultural sewage lagoons: a straw mat, a mat made from cornstalks, the PERMALON floating plastic cover (Reef Industries, Inc., Houston, Tex., U.S.A.) composed of high density polyethylene, a cover made from peat moss, a floating cover made from thin open celled polyurethane foam and a cover made from leka rock (i.e., a porous material made from lava rock and coated with an impervious material baked on the surface). For the reasons discussed above, the straw mat is not entirely satisfactory. The mats made from cornstalks and peat moss suffer from the same disadvantages as the straw mat and the peat moss is even less desirable due to its costs compared to straw and cornstalks. The PERMALON floating plastic cover and the thin open celled foam cover suffer from problems analogous to those discussed above with respect to the PVC/rubber and geotextile membrane covers of Clanton et al. Although the leka rock was found to reduce offensive gas and odor emissions and resist deterioration, it is uneconomical due to its high costs.

U.S. Pat. No. 5,861,095 and U.S. Pat. No. 5,400,549 disclose covering sewage lagoons with a series of rectangular insulated panels which are connected to each other through a grommet and cable system. Such an insulated cover is reported to reduce the odors emitted from a lagoon by (a) blocking sunlight to the surface of the lagoon, thereby decreasing the amount of algae growth on the lagoon surface; and (b) providing insulation from ambient air temperatures (e.g., freezing temperatures) to maintain a greater lagoon temperature year round, thereby increasing the activity of the bacteria in the lagoon for greater biodegradation of organic material in the lagoon. Such a cover reportedly remains buoyant even after rainfall because the rain water is able to drain through the gaps between the panels. Such gaps between the panels, however, also allow odors and harmful gases to be freely emitted from the lagoon into the atmosphere. In addition, the panels are bulky and therefore cumbersome to handle and difficult to discard.

Other covers are reported by J. Ronald Miner et al. in "A Floating Permeable Blanket to Prevent Odor Escape," *Proc. Int. Livestock Odor Conf.*, (Iowa State University, Ames Iowa, 1995), pp. 28—34. These covers included (1) a cover comprising a single layer of open celled polyurethane foam supported by a layer of closed cell polyethylene foam; (2) a cover comprising 2 layers of open celled polyurethane foam supported by a layer of closed cell polyethylene foam; (3) a cover comprising a layer of closed cell polyethylene foam; and (4) covers comprising 2 layers of open celled polyurethane foam supported by a layer of closed cell polyethylene foam and having varying amounts of zeolite between the layers of polyurethane foam. In all the covers, the closed cell polyethylene was perforated with 3 to 4 mm holes drilled in a 2 cm grid pattern.

Despite the foregoing, a need continues to exist for an improved cover which is effective in reducing odor and offensive gas emissions from sewage lagoons. There is particularly a need for a cover having an improved high-surface-area portion suitable for promoting the growth of aerobic biomass into which offensive gases from the lagoon can permeate and be destroyed through oxidation.

SUMMARY OF THE INVENTION

This invention provides for an improved cover for a body of water (e.g., a pond, swimming pool, sewage lagoon, fisheries and other aquacultural bodies of water, etc.). In particularly preferred embodiments, this invention provides for a self-floating cover which: (a) may be used to reduce odor, ammonia, hydrogen sulfide and volatile organic compound emissions from a sewage lagoon; (b) has a structure suitable for growing a layer of aerobic biomass (in particular, aerobic bacteria and/or aerobic algae) into which offensive gases from a sewage lagoon may permeate to be oxidized and thereby destroyed; (c) has sufficient buoyancy such that, even with maximal biomass growth on and within the cover, a significant portion of the cover and biomass remains above the surface of a sewage lagoon to enable the maintenance of a zone which comprises aerobic biomass into which gases from the lagoon may permeate to be oxidized and destroyed; (d) is permeable to rain water even when maximal biomass growth exists on and within the cover; and/or (e) is structured so that dead biomass on and within the cover can be washed off the cover by rain water or other source of water to better enable the continuous regeneration of living biomass on and within the cover.

Briefly, therefore, the present invention is generally directed to a self-floating cover system for a body of water.

One embodiment is directed to a self-floating cover system for reducing offensive gases and/or odors emitted from a body of water (e.g., a sewage lagoon). The cover system comprises at least one cover unit which is sized and shaped to cover at least a portion of the body of water. The cover unit is flexible and has an upper surface formed by a filamentary material (e.g., a synthetic filamentary material) capable of supporting growth of aerobic biomass (e.g., aerobic bacteria and/or aerobic algae) when the cover system is placed onto the surface of the body of water. The buoyancy of the cover unit is greater than the maximum weight of biomass that accumulates on and within the cover unit when the cover system is placed onto the surface of the body of water such that at least a portion of the upper surface of the cover unit remains above the surface of the body of water.

Another embodiment is directed to a self-floating cover system for a body of water. The cover system comprises at least one cover unit sized and shaped to cover at least a portion of the body of water. The cover unit is flexible and has a surface which is formed by a filamentary material (e.g., a synthetic filamentary material). This filamentary material is at least about 0.3 cm thick, has a unit weight of from about 2 to about 15 ounces/yd$^2$ and is capable of supporting growth of aerobic biomass thereon when the cover system is placed onto the surface of the body of water.

A further embodiment is directed to a self-floating cover system for reducing offensive gases and/or odors emitted from a sewage lagoon. This cover system comprises at least one cover unit sized and shaped to cover at least a portion of the sewage lagoon. The cover unit is flexible and has a bottom surface for resting above or below the surface of the sewage lagoon and an upper surface formed by a synthetic material having a surface area which is greater than the surface area of the material forming the bottom surface. The synthetic material forming the upper surface is capable of supporting the growth of aerobic biomass when the cover system is placed onto the surface of the sewage lagoon.

This invention is also directed to a method for using these covers on a body of water, and particularly on a sewage lagoon to reduce the emission of offensive odors and/or gases.

This invention is further directed to sewage treatment systems comprising the covers of this invention on the surface of a sewage lagoon.

Other objects and features of this invention will be in part apparent and in part pointed out hereinafter.

DESCRIPTION OF THE PREFERRED EMBODIMENTS

Figure 1:
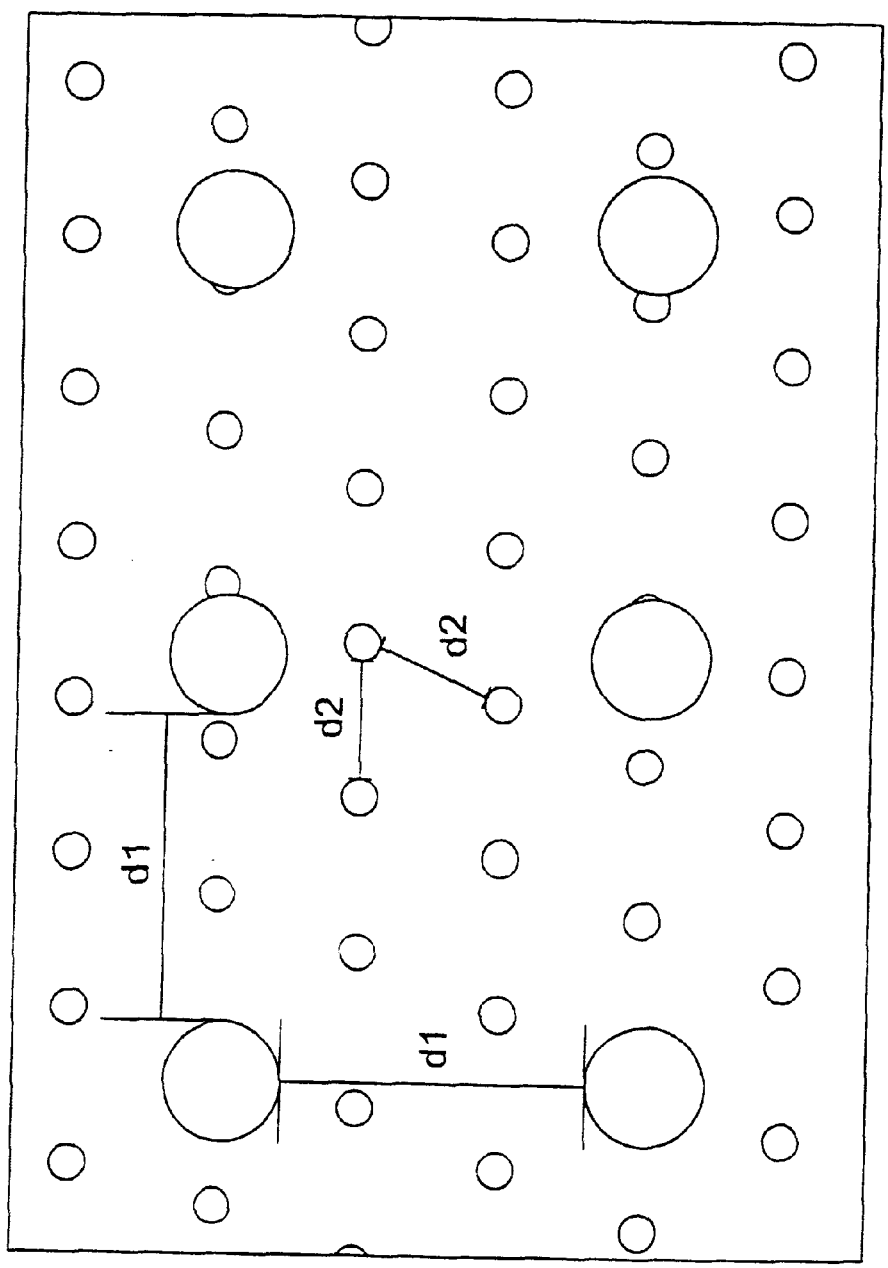
FIG. 1 shows an example of a pattern of holes that may be cut through at least one layer of the cover of the present invention. This particular pattern of holes has 2 different sizes of holes. These holes allow for: (a) rainwater to pass through the layer rather than pooling on the upper surface of the cover; (b) dead biomass to be washed through the layer by, for example, rainwater; and/or (c) offensive gases from, for example, a sewage lagoon to pass through the layer.

The cover system of this invention may be used for various purposes on various bodies of water, including, but not limited to, ponds, swimming pools, fisheries and other aquacultural environments and the like. It is particularly useful, however, for reducing offensive gas and odor emissions from agricultural sewage lagoons, such as lagoons which are used to treat sewage waste from agricultural operations producing mass quantities of pork, beef, poultry and the like. Thus, much of the following discussion will focus on cover designs which are suitable for sewage lagoons. It should be recognized, however, that this invention is not limited to cover systems for sewage lagoons and may be used on a wide variety of bodies of water.

The cover of this invention comprises synthetic material. This allows for the cover to have an effective lifetime that normally far surpasses the lifetime of a straw mat and other covers formed from natural materials. A straw mat, for example, normally has a maximum lifetime of 1 year or less and must be dredged from the bottom of a sewage lagoon after it deteriorates and sinks. Also, because the cover is synthetic, various characteristics (e.g., thickness, buoyancy, gas permeability, surface area and the like) may be manipulated and optimized, unlike covers comprising straw or other naturally-formed materials.

The cover of this invention has been observed to reduce offensive gas and odor emissions by 50% to 95%. The cover reduces offensive gas and odor emissions by, for example: (1) reducing the vapor pressure of offensive gases in the lagoon in hot environments by acting as an insulator from the hot temperatures and/or as a reflective barrier to solar radiation; (2) increasing the activity of the biomass in the lagoon for breaking down sewage in cold environments by acting as an insulator from the cold temperatures; (3) protecting the surface of the lagoon from wind to reduce the amount of offensive gases that are physically stripped from the lagoon; (4) maintaining a boundary layer of offensive gases near the surface of the lagoon to inhibit volatilization of such gases from the lagoon; and (5) maintaining a high relative humidity near the surface of the lagoon to inhibit volatilization of offensive gases from the lagoon.

Additionally, as will be discussed in detail below, the cover of this invention is particularly effective for reducing offensive gas and odor emissions because the cover has a structure which enables (and generally promotes) the growth and sustained existence of an oxygen-rich aerobic biomass zone into which offensive gases from a sewage lagoon may permeate and be destroyed via oxidation. This structure is effective at maintaining such an aerobic biomass zone even during periods of heavy and/or sustained rains and even after a maximal level of biomass has grown on and within the cover. In many embodiments, the structure of this cover is also uniquely designed to enable dead biomass on and within the cover to be washed away by rain (or another source of water) so that the biomass on and within the cover may continually be regenerated to maintain the maximum amount of living biomass on and within the cover.

In the most general sense, the cover system of the present invention comprises at least one self-floating cover (also referred to as a cover unit) which is sized and shaped to cover at least a portion of the body of water. The system may comprise one or more cover units and is thereby adaptable to the size of the body of water. Each cover is a limp, self-floating cover comprising at least one layer of buoyant material and having a surface which is suitable for growth of aerobic biomass (e.g., aerobic bacteria and/or aerobic algae) when the cover is placed onto a body of water. The term "limp" means that the cover is flexible so that it can be folded or rolled and thereby more easily transported. This is distinguishable from covers consisting of, for example, STYROFOAM panels or blocks hooked together.

The cover may comprise a single layer or multiple layers of material. The cover preferably exhibits one or more of several characteristics which include buoyancy, foldability, tear resistance, tensile strength and a large surface area suitable for aerobic biomass growth into which offensive gases (e.g., ammonia ($NH_3$), hydrogen sulfide ($H_2S$) and/or various volatile organic compounds) from a sewage lagoon may permeate and be oxidized. Materials, however, which leach significant amounts of harmful chemicals into the environment are preferably not used to form the cover.

Multi-layer covers are often more preferred because layers of different materials, which each have certain desirable characteristics, may be integrated into a single cover combining the desirable characteristics of the individual layers. Much of the following discussion, therefore, will focus on multi-layer covers because they are typically the most preferred. It should be recognized, however, that suitable single-layer covers are not excluded from this invention.

When the cover is used to cover a sewage lagoon or other bodies of water emitting significant amounts of offensive gases, it is especially desirable for the cover to have a zone which contains aerobic biomass into which the offensive gases (particularly ammonia and hydrogen sulfide) can permeate and be oxidized and thereby destroyed. To achieve this, the cover preferably has sufficient buoyancy and thickness to maintain a significant portion of the cover above the surface of the lagoon. Various covers made by others are sometimes able to achieve such a zone when they are initially placed onto the surface of a lagoon. As noted earlier, however, those covers have not been entirely satisfactory. Straw and other mats made from natural materials, for example, quickly deteriorate and sink and must ultimately be dredged from the bottom of the lagoon. The geotextile membrane cover made from TYPAR 3201C described by Clanton et al. avoids this problem by being resistant to deterioration, but still is not entirely satisfactory because it is extremely thin and consequently sinks beneath the lagoon surface as more and more biomass grows on its surface. After dropping beneath the lagoon surface, the geotextile membrane cover often remains suspended at some depth beneath the surface and does not sink to the bottom of the lagoon because the biomass on the cover is often itself buoyant to some degree. Nevertheless, because the oxygen concentration is dramatically decreased beneath the surface of a sewage lagoon as compared to the oxygen concentration above the surface, the aerobic zone on the cover substantially shrinks and often is essentially eliminated as the cover sinks beneath the surface of the lagoon. Attempts at solving this problem have included putting straw on the top of geotextile membrane covers. The straw/geotextile combination typically maintains a surface area above the sewage lagoon longer than either straw or the geotextile membrane cover alone and the presence of straw also provides a greater surface area for the growth of aerobic biomass as compared to the TYPAR 3201C cover described by Clanton et al. However, this solution has not been entirely satisfactory because the straw still deteriorates and, consequently, the straw/geotextile cover combination ultimately sinks, particularly during periods of heavy and/or sustained rain. At the very least, the straw normally must be cleaned off of the cover and replaced at least once per year, substantially increasing costs of using such a cover.

Compared to the thin geotextile cover described by Clanton et al., the cover of this invention is able to maintain a larger aerobic biomass zone over time by having a combination of thickness and buoyancy which allows a significant amount of surface area on and within the upper region of the cover to be maintained above the surface of a sewage lagoon or other body of water even after a maximal amount of biomass has grown on and within the cover. Preferably, the buoyancy of the cover when placed onto a body of water is greater than the maximum weight of algae and bacteria (i.e., the total biomass, including both aerobic and anaerobic biomass) that grow and/or accumulate on and within the cover such that at least a portion of the upper surface of the cover remains above the surface of the body of water. That is, the upward force exerted by the water on the cover is greater than the sum of the weight of the cover and the maximum weight of total biomass that accumulates on and within the cover. Even at maximal biomass growth on and within the cover, a portion of the upper surface of the cover typically remains at least 1 mm, preferably at least about 2.5 mm, more preferably at least about 5 mm, even more preferably at least about 10 mm, still even more preferably at least about 15 mm, and still yet even more preferably at least about 20 mm above the water surface. Other portions of the cover (e.g., those portions of the cover beneath the water surface), preferably provide surfaces for anaerobic biomass (e.g., anaerobic bacteria and anaerobic algae). Thus, the cover enables both anaerobic and aerobic processes to be established and proceed simultaneously in close proximity so that the processes may work in conjunction with each other to more effectively break down the sewage in the water. Effective treatment of various nitrogen compounds often requires both aerobic and anaerobic processes.

Normally, the cover's buoyancy is enhanced by one or more layers in the cover which contain buoyancy-imparting material. This buoyancy-imparting material is in the form of one or more layers of material having a specific gravity of less than 1.0. It is often preferable to use multiple thin layers of a buoyancy-imparting material because the use of multiple layers provides more surface area within the cover for biomass to grow and also typically increases the loft (i.e., the thickness per weight of material) of the cover relative to the loft which is obtained using a single layer comprised of the same amount of the same material. The preferred buoyancy and total thickness of the buoyancy-imparting layer(s) will vary, depending on (1) the buoyancy of any other components of the cover, (2) the amount and buoyancy of the biomass that will ultimately grow on the cover once it is placed on the body of water and (3) the desired thickness of the aerobic biomass zone. Normally, the preferred specific gravity of the buoyancy-imparting layer(s) is no greater than about 0.95, more preferably from about 0.01 to about 0.95, even more preferably from about 0.01 to about 0.50, and still even more preferably from about 0.01 to about 0.10. Suitable buoyancy-imparting materials include, for example, various closed cell foams and other porous materials and kapok. Suitable closed cell foams include, for example, polyethylene closed cell foam and polypropylene closed cell foam, with polypropylene closed cell foam often being the more preferred material due to polypropylene's low specific gravity (i.e., about 0.91), heat lamination characteristics and roll-ability. The preferred thickness of the closed cell foam will vary, but typically is at least about 0.8 mm, more preferably at least about 2.4 mm, even more from about 2.4 to about 12.7 mm, and still even more preferably from about 2.4 to about 9.6 mm.

As noted above, when the cover is used on a body of water (e.g., a sewage lagoon) that emits offensive oxidizable gases, it is preferable to maximize the amount of aerobic biomass (e.g., aerobic bacteria and/or aerobic algae) growing on and within the cover. One way to achieve this is to include a high surface area structure which is exposed to the air above the lagoon surface when the cover is floating on the lagoon. The high-surface-area structure is typically in the form of a layer of material which has a high specific surface area and is permeable to gases (particularly ammonia, hydrogen sulfide and volatile organic compounds) emitted from the lagoon and oxygen from the air above the lagoon, such that the gases from the lagoon can be oxidized by the aerobic biomass.

In one embodiment, for example, the high-surface-area structure comprises a layer of highly porous granules or particles adhered to the top layer (e.g., a buoyancy-imparting layer or a strength-imparting layer as described below) of the cover. The size of the particles preferably ranges from about 20 to about 200 $\mu$m, and the specific surface area preferably is from about 50 to about 600 $m^2/g$. Suitable materials for such microporous particles include, for example, carbon, silica, polyurethane, copolymers of styrene and divinyl benzene and the like.

In a more preferred embodiment, the high-surface-area structure comprises one or more layers of open cell foam. The high specific surface area of open cell foam stems from the reticulated open pore surface of such foam. To enhance the growth of algae, the cell size of the open pore structure preferably is from about 20 to about 2,000 $\mu$m. The specific surface area of the foam preferably is at least about 1.5 $m^2/g$, more preferably from about 1.9 to about 20 $m^2/g$. Suitable foam materials include, for example, open cell polypropylene foam, open cell polyethylene foam and other open cell foldable foams.

In another more preferred embodiment, the high-surface-area structure comprises one or more layers of a filamentary material. Suitable filamentary materials include, for example, felt materials and, more preferably, polyester batting, polypropylene batting, polyethylene batting and other high loft material.

The most preferred high-surface-area filamentary materials are typically polypropylene batting or polyester batting because both are generally durable over long periods when used in the context of sewage lagoons. Polypropylene batting is particularly preferred because its specific gravity (i.e., about 0.91) is less than the specific gravity of polyester (i.e., about 1.37) and therefore also promotes floatation. Polyester batting, however, is also often preferable due to its relative low cost. Both polyester batting and polypropylene batting may be used to form batting having a high loft (i.e., relatively large thickness per weight of material). Because of this high loft, such batting provides a thick, low-density, high-surface-area, gas permeable region which may easily be sustained above the lagoon surface for aerobic biomass growth even as the weight of the cover increases over time due to the growth of more and more biomass on and within the cover. The preferred thickness of the layer of batting is normally at least about 3 mm, more preferably from about 3 to about 250 mm, even more preferably from about 5 to about 50 mm, and still even more preferably from about 10 to about 40 mm. The unit weight of the batting is preferably at least about 10 $g/m^2$, and more preferably from about 10 to about 900 $g/m^2$. In a particularly preferred embodiment, the unit weight is at least about about 70 $g/m^2$ (i.e., at 1 east about 2 ounces/$yd^2$), more preferably from about 70 to about 510 $g/m^2$ (i.e., from about 2 to about 15 ounces/$yd^2$), and even more preferably from about 150 to about 510 $g/m^2$ (i.e., from about 5 to about 15 ounces/$yd^2$).

In a particularly preferred embodiment, the high-surface-area material is compressible, which allows for easier transport when the cover is folded or rolled up. Preferably, however, the high-surface-area material decompresses back to its original thickness after being unfolded or unrolled for use (i.e., the material may be unfolded or unrolled "without memory").

The cover may conveniently be selectively inoculated with various natural and/or biologically engineered bacteria and algae to optimize the desired effects of the cover. For example, when the cover is used with sewage lagoons, it is often preferable to inoculate the cover with ammonia-resistant bacteria and algae (typically aerobic bacteria and aerobic algae) which consume ammonia and/or hydrogen sulfide. The desired bacteria and algae growth may also be enhanced by spreading nutrients onto cover which promote such growth.

Often, buoyancy-imparting materials and materials with high specific surface area do not provide the desired strength and would tear or puncture during use, particularly where the cover is used in extreme or varying winds and/or temperatures. In such an instance, it is preferable to include a strength-imparting material in the cover, typically in the form of a separate layer(s). This strength-imparting material may comprise any flexible material having the desired tear resistance and tensile strength. When the strength-imparting material is contained in a discrete layer, the strength-imparting layer preferably comprises a material which may be conveniently bonded to at least one of the other layers in the cover. The material also preferably is resistant to deterioration in the context in which the cover is intended to be used. Often suitable materials include, for example, flexible metal materials (e.g., chicken wire, thin sheets of flexible metal such as tin, etc.), plastic and polymeric filamentary materials.

Typically, it is particularly preferable to use a strength-imparting material comprising a polymeric filamentary material. The preference for such materials stems from the fact that filamentary materials tend to be light weight and relatively inexpensive. Such materials also tend to have a surface area which is conducive to aerobic and/or anaerobic biomass growth. The tensile strength of the filamentary material (or any other polymeric strength-imparting layer) is preferably at least about 10 lbs (for a 3-inch strip), more preferably at least about 40 lbs (for a 3-inch strip), even more preferably at least about 100 lbs (for a 3-inch strip), and still even more preferably at least about 150 lbs (for a 3-inch strip).

Particularly preferred filamentary materials comprise polypropylene and/or polyethylene, with polypropylene often being the more preferred. Such commercially available materials include, for example, the polypropylene fabrics sold under the TYPAR mark by Reemay (Old Hickory, Tenn. U.S.A.). TYPAR is a spun-bonded, continuous filament structure. Such a structure has a low specific gravity, while also having high tensile and tear strengths in all directions due to uniform stress distribution. And, because TYPAR is non-woven, it typically does not fray or unravel and can be cut with a clean edge. TYPAR also can be processed in a variety of applications at temperatures of up to 300° F. (about 150° C.), which allows for it to be, for example, adhered to other materials (i.e., other layers of the cover) having melt temperatures of less than 300° F. In addition, the polypropylene composition of TYPAR makes it inert in most alkali, acidic and salt environments. Further, such a material is resistant to environmental stress and cracking and is hydrophobic (i.e., it is resistant to soaking up water and thereby becoming less buoyant).

Another particularly preferred filamentary material is non-woven needle-punch felt made from staple fibers. These fabrics are often particularly preferred because they are often permeable to offensive gases emitted from a lagoon, which, in turn, allows such gases to pass through the fabric to access the aerobic biomass above the fabric. These fabrics also are particularly preferred because they are often permeable to rain water, thereby allowing rain water to pass through the fabric into the lagoon rather than pooling on the surface of the fabric. It is nevertheless often preferred for such fabrics to also contain openings which further promote the passing of rainwater, dead biomass and lagoon gases through the fabric. Commercially-available felt fabrics which are particularly preferred include the polypropylene fabrics sold under the AMOCO name by Nilex (Englewood, Colo. U.S.A.), especially AMOCO No. 4553.

When the cover comprises more than one layer, such layers are preferably coextensive with each other (i.e., each layer extends across substantially the entire length and width of the cover). The layers may, for example, be attached to each other using one or more various techniques widely known in the art. For example, such layers may often may be welded together (i.e., the layers may be heated to an extent sufficient to melt at least one of the layers at each interface to cause a bond to form at the interface). The layers may alternatively be sewn to each other. Or, as a further alternative example, the layers may be adhered to each other using an adhesive (e.g., a suitable extruded adhesive).

As noted previously, the cover of this invention has an oxygen-rich aerobic biomass zone into which offensive gases from the lagoon and oxygen from above the lagoon may permeate so that the offensive gases may be oxidized (and thereby destroyed) by the aerobic biomass. Attempts by others to obtain such a cover have not been entirely satisfactory. With the geotextile membrane cover made of TYPAR 3201C described by Clanton et al., for example, the biomass tends to form a seal over time which eventually becomes substantially impermeable to any gases, thereby essentially eliminating the aerobic digestion of the gases being emitted from the lagoon. Such self-sealing of the biomass also causes the cover to become impermeable to rain water such that during rains, puddles form on top of the cover which submerge and kill at least a portion or all the aerobic biomass zone on the cover. These puddles also weigh down the cover, thereby creating stress on the structures holding the cover in place.

To avoid the problems associated with rain water collecting on the cover surface and to maintain an aerobic zone effective for oxidizing gases emitted from the lagoon, the cover preferably has a plurality of small openings distributed (preferably evenly distributed) throughout the cover. These openings are also advantageous because they allow for dead biomass on the cover to washed off the cover and into the lagoon by, for example, rain water. The size of the openings may vary widely and more than one size of opening may be used. The cover preferably has openings that are at least about 0.5 mm in their largest dimension, more preferably at least about 1 mm in their largest dimension, even more preferably from about 2.5 to about 50 mm in their largest dimension, and still more preferably from about 5 to about 30 mm in their largest dimension.

Often, it is especially preferable for the cover to have a combination of small openings (preferably from about 0.5 to about 10 mm, more preferably from about 4 to about 10 mm in their largest dimension, and still more preferably from about 4 to about 6 mm in their largest dimension) and large openings (preferably at least about 10 mm in their largest dimension, more preferably from about 10 to about 30 mm in their largest dimension, and still more preferably from about 10 to about 20 mm in their largest dimension). The small openings are particularly conducive to gas permeability, while the large openings are particularly conducive to gas permeability, fast drainage of rain water and the removal of dead biomass.

The preferred distance between the openings may vary widely and depends on the size(s) of the openings. Generally, the openings are preferably spaced in a manner which maximizes the effect of the aerobic biomass zone without jeopardizing the mechanical integrity of the cover. Typically, the preferred distance between openings is at least about 1 cm, more preferably from about 1 to about 10 cm, and even more preferably from about 2 to about 9 cm. If the cover has both small and large openings, the large openings are generally spaced farther apart than the small openings.

With multi-layer covers, it is not always preferred for the openings to be contiguous through every layer in the cover. This is particularly true if the cover comprises a layer which remains permeable to rain water and gases regardless of the amount of biomass that grows on and within the layer. Often, for example, a high-surface-area layer, particularly a layer comprising a high-loft, batting material, remains permeable to rain water and gases even after maximal growth of biomass on and within the layer. In contrast, buoyancy-imparting layers, comprising, for example, closed cell foam and/or strength-imparting layers are often not gas and/or rain-water permeable, particularly over time as the biomass on and within such the layers grows. In such an instance, it is preferred for only the buoyancy-imparting and/or strength-imparting layers to contain discrete openings for gas and rain water permeability.

As noted earlier, the cover is preferably limp (i.e., flexible) so that it may be folded or rolled for easy transport. Such flexibility also allows the cover to adjust to varying levels of the body of water. For example, the flexibility of the cover allows the cover to adjust when the water level decreases during drought conditions or drainage of the body of water, or when the water level increases during, for example, periods of heavy rain.

Normally, the total thickness of the cover preferably is at least about 5 mm, more preferably at least about 10 mm, even more preferably at least about 15 mm, and still even more preferably at least about 20 mm. Covers having a lesser thickness often are unable to maintain a suitable surface area for aerobic biomass, particularly over time as the cover becomes substantially covered with biomass. The thickness of the cover also preferably does not exceed about 5 cm. Although covers thicker than about 5 cm may be used, they are typically less easy to transport.

The self-floating cover system may conveniently be prepared in the form of separate strips or covers (i.e., cover units, each of which are typically limp) for easy handling and transport. To illustrate, applicants have previously used strips having a width of 12 to 15 feet and a length of 200 feet. The preferred size of the strips (and particularly the preferred length of the strips) will depend, for example, on the size of the body of water being covered and the thickness of the cover. The preferred length of the strips will generally be shorter for covers comprising thicker materials because covers comprising thicker materials are more bulky when rolled or folded. To form a complete cover system for a body of water, the cover units or strips may conveniently be connected to each other onsite at the time of installation. There are many techniques widely known in the art which may be used to connect these strips. For example, such strips may be welded together, sewn together and/or adhered together using an adhesive.

Where the cover system does comprise several discrete units attached together, the buoyancy of each unit preferably is greater than the maximum weight of algae and bacteria that can grow on and within the unit when the cover system is placed onto a sewage lagoon or other body of water. Even at maximal biomass growth on and within the cover system, a portion of each unit typically remains at least 1 mm, preferably at least about 2.5 mm, more preferably at least about 5 mm, even more preferably at least about 10 mm, still even more preferably at least about 15 mm, and still yet even more preferably at least about 20 mm above the water surface.

It should be noted that where the cover comprises units (i.e., strips) which are connected for use, the layers of the units may not be entirely coextensive. Instead, one or more layers may extend beyond the remaining layers so that the strips can be more easily welded, sewn, or otherwise connected to each other.

The materials used in the cover preferably are resistant to deterioration for at least 5 years under the intended conditions of the cover. It should be recognized that the lifetime of many polymeric materials (particularly those materials which face away from the body of water and therefore directly exposed to sunlight) may be increased by applying a UV radiation resistant coating to such materials.

In addition to being an advantageous cover for sewage lagoons, the cover of this invention is also particularly advantageous for fisheries and other aquacultural bodies of water. By including a high-surface-area material in the cover, the cover may, in many instances, advantageously provide a significantly greater surface area than naturally-occurring plants for growth or reproduction of various aquatic species. The cover may, for example, act to promote the production of biomass that, in turn, is consumed by the species being farmed in the aquacultural body of water. In one embodiment, for example, the cover acts to promote the reproduction and growth of zooplankton (such as, for example, daphnia, cyclops and paramecium infusora), which, in turn, act as a food source for many aquaculturally-farmed aquatic species (e.g., fish, shrimp, molluscs, etc.) in the same body of water. The cover may also act as a shelter and/or reproductive support for the actual aquatic species being farmed.

EXAMPLES

These examples further illustrate and explain the invention. The invention, however, should not be considered to be limited to any of the details in these examples.

Each of these examples describes a multi-layer cover particularly suitable for sewage lagoons. The layers used in each of the covers have one of the following compositions:

A. A strength-imparting layer comprising a 7 denier, non-woven polypropylene geotextile fabric having a hydrophillic finish (AMOCO No. 4553, Nilex, Englewood, Colo. U.S.A.). According to the manufacturer, this fabric has a unit weight of 8 oz/yd$^2$ (ASTM D-5261), a thickness of 70–75 mil thick, a grab tensile strength of 203 lbs (ASTM D-4632), a grab elongation of 50% (ASTM D-4632), a puncture strength of 130 lbs (ASTM D-4833), a mullen burst of 450 psi (ASTM D-3786), a trapezoidal tear strength of 80 lbs (ASTM D-4533), an apparent opening size of 0.15 mm (ASTM D-4751) and a UV resistance of 70% retention at 500 hours (ASTM D-5455).

B. A strength-imparting layer comprising a 10 denier (per filament), non-woven polypropylene fabric (TYPAR 3151, Reemay, Old Hickory, Tenn. U.S.A.). According to the manufacturer, this fabric has a unit weight of 1.60 oz/yd$^2$, a thickness of 8.5 mils, a sheet grab tensile strength of 46 lbs in both the machine and transverse directions, a trapezoidal tear strength of 23 lbs in the machine direction, a trapezoidal tear strength of 24 lbs in the transverse direction and a mullen burst of 40 psi.

C. A strength-imparting layer comprising a 5×7 mm square-stitch made from polypropylene.

D. A buoyancy-imparting layer comprising closed cell polypropylene foam (MICROFOAM, Tenneco Packaging, Lake Forest, Ill., U.S.A.). According to the manufacturer, this foam has a specific gravity of 0.01 and each layer has a thickness of 2.4 mm.

E. A buoyancy-imparting layer comprising closed cell polyethylene foam. This foam has a thickness of 3.2 mm.

F. A high-surface-area layer containing a 30 denier, high-loft polypropylene staple material having a thickness of 20 mm (Drake Extrusion, Inc., Martinsville, Va., U.S.A.). The unit weight of this material is from 8 to 10 ounces/yd$^2$.

G. A high-surface-area layer containing a high-loft polypropylene staple material having a thickness of 25 mm (FiberCraft, Inc., Tupelo, Miss., U.S.A.). The unit weight of this material is from 8 to 10 ounces/yd$^2$.

Example 1

The cover of this example had multiple layers in the following order from bottom to top (i.e., from the side intended to be facing the lagoon surface to the side intended to be facing away from the lagoon surface):

a. One strength-imparting layer comprising Composition B.

b. Six buoyancy-imparting layers comprising Composition D.

c. One high-surface-area layer comprising Composition F.

Contiguous holes passed through the bottom 7 layers. Two different sizes of holes were used: holes having a diameter of 1.4 cm and holes having a diameter of 0.6 cm. FIG. 1 shows the pattern of hole spacing. The distance $d^1$ between the largest holes was 8.4 to 9.4 cm and the distance $d^2$ between the smaller holes was 2 cm.

The strength-imparting and buoyancy-imparting layers were bonded together by partially melting their surfaces under heat. The high-surface-area layer was bonded to the adjacent buoyancy-imparting layer with adhesive.

For easy handling, the cover system was prepared in strips which were 13.8 feet wide and 220 feet long.

Example 2

The cover of this example had multiple layers in the following order from bottom to top:

a. 2 buoyancy-imparting layers comprising Composition D.

b. One strength-imparting layer comprising Composition A.

c. One high-surface-area layer comprising Composition G.

Figure 2:
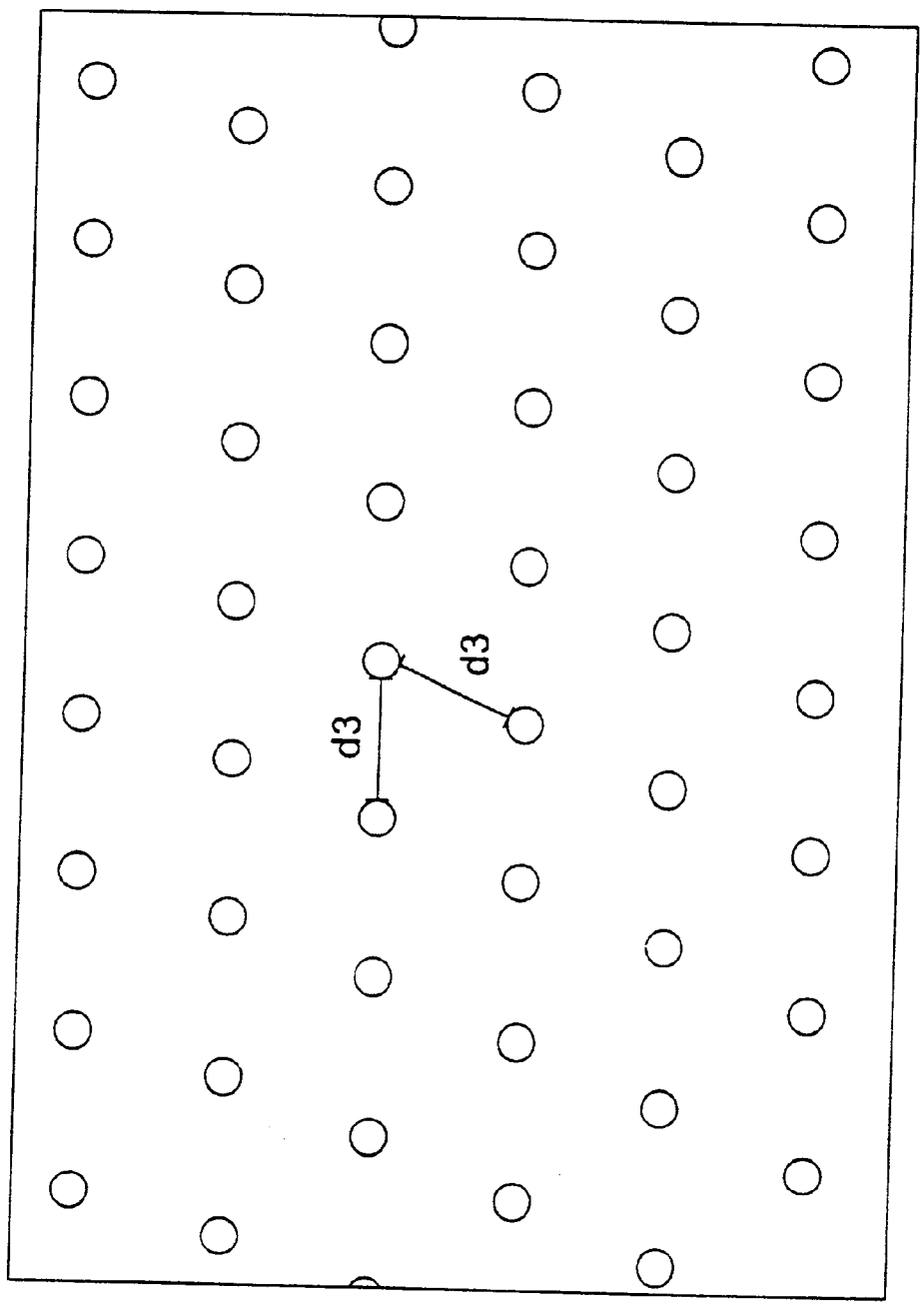
FIG. 2 another example of a pattern of holes that may be cut through at least one layer of the cover of the present invention. This particular pattern only has one size of holes. These holes serve the same purpose(s) as those in FIG. 1.

Contiguous holes passed through the bottom 2 layers. The holes had a diameter of 0.4 cm. FIG. 2 shows the pattern of hole spacing. The distance $d^3$ between the holes was roughly 0.5 to 2.0 cm.

The strength-imparting and buoyancy-imparting layers were bonded together by partially melting their surfaces under heat. The high-surface-area layer was bonded to the adjacent strength-imparting layer with adhesive.

Example 3

The cover of this example had multiple layers in the following order from bottom to top:

a. 3 buoyancy-imparting layers comprising Composition D.

b. One strength-imparting layer comprising Composition A.

c. One high-surface-area layer comprising Composition G.

Contiguous holes having a diameter of 0.4 cm passed through the bottom 4 layers. Referring to FIG. 1, the distance between these holes ($d^2$) was about 2 cm. Other contiguous holes having a diameter of 1.2 cm passed through all the layers. The distance between those holes ($d^1$) was roughly 9 to 11 cm.

The strength-imparting and buoyancy-imparting layers were bonded together by partially melting their surfaces under heat. The high-surface-area layer was bonded to the adjacent strength-imparting layer with adhesive.

The layers were coextensive, except that the strength-imparting layer extended beyond the other layers by about 3 inches at the edges so that it could easily be connected with a similar extended portion of another unit of the cover.

Example 4

The cover of this example had multiple layers in the following order from bottom to top:

a. Three buoyancy-imparting layers comprising Composition D.

b. One strength-imparting layer comprising Composition B.

c. Two buoyancy-imparting layers comprising Composition D.

d. One high-surface-area layer comprising Composition G.

Contiguous holes passed through the bottom 6 layers. Two different sizes of holes were used: holes having a diameter of 1.6 cm and holes having a diameter of 0.4 cm. FIG. 1 shows how the holes were spaced. The distance $d^2$ between the largest holes was 6 cm and the distance $d^2$ between the smaller holes was 2 cm.

The strength-imparting and buoyancy-imparting layers were bonded together by partially melting their surfaces under heat. The high-surface-area layer was bonded to the adjacent buoyancy-imparting layer with adhesive.

Example 5

The cover of this example had multiple layers in the following order from bottom to top:

a. One strength-imparting layer comprising Composition B.

b. Six buoyancy-imparting layers comprising Composition D.

Contiguous holes passed through all the layers. Two different sizes of holes were used: holes having a diameter of 1.6 cm and holes having a diameter of 0.6 cm. FIG. 1 shows how the holes were spaced. The distance $d^2$ between the largest holes was 9 cm and the distance $d^2$ between the smaller holes was roughly 0.5 to 2 cm.

The strength-imparting and buoyancy-imparting layers were bonded together by partially melting their surfaces under heat.

Example 6

The cover of this example had multiple layers in the following order from bottom to top:

a. One buoyancy-imparting layer comprising Composition D.

b. One strength-imparting layer comprising Composition A.

Contiguous holes passed through both layers. The holes had a diameter of 0.6 cm. FIG. 2 shows how the holes were spaced. The distance $d^3$ between the holes was 2.2 cm.

The layers were bonded together by partially melting their surfaces under heat.

Example 7

The cover of this example has multiple layers in the following order from bottom to top:

a. One buoyancy-imparting layer comprising Composition E.

b. One strength-imparting layer comprising Composition A.

The buoyancy-imparting layer had holes having a diameter of 1.2 cm. FIG. 2 shows how the holes are spaced. The distance ($d^3$) between the holes was from 4.4 to 5.2 cm.

The layers were bonded together by partially melting their surfaces under heat.

Example 8

The cover of this example had multiple layers in the following order from bottom to top:

a. Two buoyancy-imparting layers comprising Composition D.

b. One strength-imparting layer comprising Composition A.

Contiguous holes passed through both layers. The holes had a diameter of 1.0 cm. FIG. 2 shows how the holes were spaced. The distance $d^3$ between the holes was 2.2 cm.

The layers were bonded together by partially melting their surfaces under heat.

Example 9

The cover of this example has multiple layers in the following order from bottom to top:
 a. One strength-imparting layer comprising Composition C.
 b. One buoyancy-imparting layer comprising Composition D.
 c. One high-surface-area layer comprising Composition F.

The buoyancy-imparting layer had holes having a diameter of 0.6 cm. The strength-imparting and buoyancy-imparting layers were bonded together by partially melting their surfaces under heat. The high-surface-area layer was bonded to the adjacent buoyancy-imparting layer with adhesive.

Example 10

The cover of this example has multiple layers in the following order from bottom to top:
 a. One buoyancy-imparting layer comprising Composition D.
 b. One strength-imparting layer comprising Composition C.
 c. One high-surface-area layer comprising Composition F.

The buoyancy-imparting layer had holes having a diameter of 0.6 cm. The high-surface-area layer was bonded to the adjacent buoyancy-imparting layer with adhesive, which, in turn, locked in the strength-imparting layer. The strength-imparting and buoyancy-imparting layers also may be bonded together by partially melting their surfaces under heat.

Example 11

The cover of this example has multiple layers in the following order from bottom to top:
 a. One buoyancy-imparting layer comprising Composition D.
 b. One high-surface-area layer comprising Composition F.
 c. One strength-imparting layer comprising Composition C.

The buoyancy-imparting layer had holes having a diameter of 0.6 cm. The high-surface-area layer was bonded to the adjacent strength-imparting and buoyancy-imparting and buoyancy-imparting layers with adhesive.

The above description of the preferred embodiments and accompanying figures are intended only to acquaint others skilled in the art with the invention, its principles and its practical application, so that others skilled in the art may adapt and apply the invention in its numerous forms, as may be best suited to the requirements of a particular use. The present invention, therefore, is not limited to the above embodiments and may be variously modified.

With reference to the use of the word(s) "comprise" or "comprises" or "comprising" in the above description and/or in the following claims, applicants note that unless the context requires otherwise, those words are used on the basis and clear understanding that they are to be interpreted inclusively, rather than exclusively and that applicants intend each of those words to be so interpreted in construing the above description and/or the following claims.

We claim:

1. A self-floating cover system for reducing offensive gases and/or odors emitted from a body of water, the cover system comprising:
   at least one gas permeable cover unit sized and shaped to cover at least a portion of the body of water, said cover unit being flexible and having an upper surface formed by a filamentary material and capable of supporting growth of aerobic biomass capable of oxidizing emissions from the body of water thereon when the cover system is placed onto the surface of the body of water, a buoyancy-imparting layer substantially coextensive with the cover unit in area of coverage and constructed of a buoyant material comprising closed cell foam, the buoyancy of said cover unit being greater than the maximum weight of biomass that accumulates on and within said cover unit when the cover system is placed onto the surface of the body of water such that at least a portion of the upper surface of the cover unit remains above the surface of the body of water.

2. A self-floating cover system according to claim 1 comprising multiple cover units connected together and wherein each cover unit is flexible and has an upper surface which is formed by a filamentary material and capable of supporting growth of aerobic biomass thereon when the cover system is placed onto the surface of the body of water, the buoyancy of each cover unit being greater than the maximum weight of biomass that accumulates on and within said cover unit when the cover system is placed onto the surface of the body of water such that at least a portion of the upper surface of each cover unit remains above the surface of the body of water.

3. A self-floating cover system according to claim 1 wherein the buoyancy of said cover unit is sufficient such that a portion of the upper surface of said cover unit remains at least about 1 mm above the surface of the body of water after said maximum weight of biomass has accumulated on and within said cover unit.

4. A self-floating cover system according to claim 1 wherein the buoyancy of said cover unit is sufficient such that a portion of the upper surface of said cover unit remains at least about 0.25 cm above the surface of the body of water after said maximum weight of biomass has accumulated on and within said cover unit.

5. A self-floating cover system according to claim 1 wherein the buoyancy of said cover unit is sufficient such that a portion of the upper surface of said cover unit remains at least about 0.5 cm above the surface of the body of water after said maximum weight of biomass has accumulated on and within said cover unit.

6. A self-floating cover system according to claim 1 wherein the buoyancy of said cover unit is sufficient such that a portion of the upper surface of said cover unit remains at least about 1 cm above the surface of the body of water after said maximum weight of biomass has accumulated on and within said cover unit.

7. A self-floating cover system according to claim 1 wherein the buoyancy of said cover unit is sufficient such that a portion of the upper surface of said cover unit remains at least about 1.5 cm above the surface of the body of water after said maximum weight of biomass has accumulated on and within said cover unit.

8. A self-floating cover system according to claim 1 wherein the buoyancy of said cover unit is sufficient such that a portion of the upper surface of said cover unit remains at least about 2 cm above the surface of the body of water after said maximum weight of biomass has grown on and within said cover unit.

9. A self-floating cover system according to claim 1 wherein said cover unit comprises a layer having a plurality of openings which are at least about 0.5 mm in their largest dimension.

10. A self-floating cover system according to claim 1 wherein said cover unit comprises a layer having a plurality of openings which are from about 2.5 to about 50 mm in their largest dimension.

11. A self-floating cover system according to claim 1 wherein said cover unit comprises a layer having a plurality of openings which are from about 5 to about 30 mm in their largest dimension.

12. A self-floating cover system according to claim 1 wherein the cover system is structured such that when the maximum weight of biomass has accumulated on and within the cover system, the cover system and biomass remain permeable to rain water such that substantially all the rain water will pass through the biomass and cover system rather than pool on top of the cover system.

13. A self-floating cover system according to claim 1 wherein the cover system is structured such that when the maximum weight of biomass has accumulated on and within said cover system, the cover system remains permeable to gases discharged from said body of water to allow gases from the body of water to permeate into aerobic biomass on and within said cover system so that the gases can be oxidized.

14. A self-floating cover system according to claim 1 wherein said buoyant material comprises closed cell polyethylene foam.

15. A self-floating cover system according to claim 1 wherein said buoyant material comprises closed cell polypropylene foam.

16. A self-floating cover system for reducing offensive gases and/or odors emitted from a body of water, the cover system comprising:
at least one gas permeable cover unit sized and shaped to cover at least a portion of the body of water, said cover unit being flexible and having an upper surface formed by a filamentary material and capable of supporting growth of aerobic biomass capable of oxidizing emissions from the body of water thereon when the cover system is placed onto the surface of the body of water, a buoyancy-imparting layer substantially co-extensive with the cover unit in area of coverage and constructed of a buoyant material, the buoyancy of said cover unit being greater than the maximum weight of biomass that accumulates on and within said cover unit when the cover system is placed onto the surface of the body of water such that at least a portion of the upper surface of the cover unit remains above the surface of the body of water, said cover unit comprising a layer having a plurality of two differently sized openings, the smaller openings being from about 0.5 to about 10 mm in their largest dimension and the larger openings being at least about 10 mm in their largest dimension.

17. A self-floating cover system for reducing offensive gases and/or odors emitted from a body of water, the cover system comprising:
at least one gas permeable cover unit sized and shaped to cover at least a portion of the body of water, said cover unit being flexible and having an upper surface formed by a filamentary material and capable of supporting growth of aerobic biomass capable of oxidizing emissions from the body of water thereon when the cover system is placed onto the surface of the body of water, a buoyancy-imparting layer substantially coextensive with the cover unit in area of coverage and comprising multiple layers, at least two of which are formed of different buoyant materials, the buoyancy of said cover unit being greater than the maximum weight of biomass that accumulates on and within said cover unit when the cover system is placed onto the surface of the body of water such that at least a portion of the upper surface of the cover unit remains above the surface of the body of water, and
a strength-imparting layer comprising a material having a tensile strength greater than the tensile strength of the buoyancy-imparting layer that is substantially coextensive with the cover unit in area of coverage.

18. A self-floating cover system according to claim 17 wherein said strength-imparting layer forms at least a portion of the upper surface of said cover unit capable of supporting growth of aerobic biomass.

19. A self-floating cover system according to claim 17 wherein said cover unit comprises microporous particles which form at least a portion of the upper surface of said cover unit capable of supporting growth of aerobic biomass.

20. A self-floating cover system according to claim 19 wherein at least a portion of said microporous particles are on the surface of said buoyancy-imparting layer.

21. A self-floating cover system according to claim 19 wherein at least a portion of said microporous particles are on the surface of said strength-imparting layer.

22. A self-floating cover system according to claim 17 wherein a further layer comprising an open cell foam forms at least a portion of the upper surface of said cover unit capable of supporting growth of aerobic biomass.

23. A self-floating cover system according to claim 17 wherein a further layer comprising said filamentary material forms at least a portion of the upper surface of said cover unit capable of supporting growth of aerobic biomass.

24. A self-floating cover system according to claim 23 wherein said filamentary material comprises polymeric batting.

25. A self-floating cover system according to claim 23 wherein said filamentary material comprises felt.

26. A self-floating cover system according to claim 23 wherein said filamentary material is at least about 1 cm thick and has a unit weight of from about 2 to about 15 ounces/yd$^2$.

27. A self-floating cover system for reducing offensive cases and/or odors emitted from a body of water, the cover system comprising:
at least one gas permeable cover unit sized and shaped to cover at least a portion of the body of water, said cover unit being flexible and having an upper surface formed by a filamentary material and capable of supporting growth of aerobic biomass capable of oxidizing emissions from the body of water thereon when the cover system is placed onto the surface of the body of water, a buoyancy-imparting layer substantially coextensive with the cover unit in area of coverage and constructed of a buoyant material, the buoyancy of said cover unit being greater than the maximum weight of biomass that accumulates on and within said cover unit when the cover system is placed onto the surface of the body of water such that at least a portion of the upper surface of the cover unit remains above the surface of the body of water, said buoyancy-imparting layer forming at least a portion of the upper surface of said cover unit capable of supporting growth of aerobic biomass.

28. A self-floating cover system for reducing offensive gases and/or odors emitted from a body of water, the cover system comprising:
at least one gas permeable cover unit sized and shaped to cover at least a portion of the body of water, said cover unit being flexible and having an upper surface formed by a filamentary material and capable of supporting growth of aerobic biomass capable of oxidizing emissions from the body of water thereon when the cover system is placed onto the surface of the body of water, a buoyancy-imparting layer substantially coextensive with the cover unit in area of coverage and constructed of a buoyant material, the buoyancy of said cover unit being greater than the maximum weight of biomass that accumulates on and within said cover unit when the cover system is placed onto the surface of the body of water such that at least a portion of the upper surface of the cover unit remains above the surface of the body of water;

a strength-imparting layer comprising a material having a tensile strength greater than the tensile strength of the buoyancy-imparting layer, said buoyancy-imparting layer and/or said strength-imparting layer having a plurality of openings which are from about 2.5 to about 50 mm in their largest dimension; and a layer comprising said filamentary material which forms at least a portion of the upper surface of the cover unit capable of supporting growth of aerobic biomass, said filamentary material being from about 1 to about 4 cm thick and having a unit weight of from about 5 to about 15 ounces/yd$^2$.

29. A sewage treatment system comprising the cover system of claim 28 on the surface of a sewage lagoon.

30. A sewage treatment system according to claim 29 wherein the cover system is sized and shaped to substantially cover the sewage lagoon.

31. A self-floating cover system for a body of water, the cover system comprising at least one cover unit sized and shaped to cover at least a portion of the body of water, said cover unit being flexible and comprising:

a buoyancy-imparting layer;

a strength-imparting layer comprising a material having a tensile strength greater than the tensile strength of the buoyancy-imparting layer, said buoyancy-imparting layer and/or said strength-imparting layer having a plurality of openings which are from about 2.5 to about 50 mm in their largest dimension; and a layer comprising synthetic filamentary material comprising polypropylene which forms at least a portion of the surface of said cover unit capable of supporting growth of aerobic biomass thereon when the cover system is placed onto the surface of the body of water, said synthetic filamentary material being from about 1 to about 4 cm thick and having a unit weight of from about 5 to about 15 ounces/yd$^2$.

32. A sewage treatment system comprising the cover system of claim 31 on the surface of a sewage lagoon.

33. A sewage treatment system according to claim 32 wherein said cover system is sized and shaped to substantially cover the sewage lagoon.

34. A self-floating cover system for reducing offensive gases and/or odors emitted from a sewage lagoon, the cover system comprising:

at least one cover unit sized and shaped to cover at least a portion of the sewage lagoon, the cover unit being flexible and having a bottom surface for resting above or below the surface of the sewage lagoon and an upper surface formed by a synthetic material having a surface area which is greater than the surface area of the material forming the bottom surface, the synthetic material being capable of supporting the growth of aerobic biomass when the cover system is placed onto the surface of the sewage lagoon.

35. A self-floating cover system according to claim 36 wherein said cover unit comprises a layer having a plurality of openings which are from about 2.5 to about 50 mm in their largest dimension.

36. A sewage treatment system comprising the cover system of claim 34 on the surface of a sewage lagoon.

37. A sewage treatment system according to claim 36 wherein said cover system is sized and shaped to substantially cover the sewage lagoon.

38. A self-floating cover system for reducing offensive gases and/or odors emitted from a body of water, the cover system comprising:

at least one cover unit sized and shaped to cover at least a portion of the body of water, said cover unit being flexible and having an upper surface formed by a filamentary material and capable of supporting growth of aerobic biomass thereon when the cover system is placed onto the surface of the body of water, the buoyancy of said cover unit being greater than the maximum weight of biomass that accumulates on and within said cover unit when the cover system is placed onto the surface of the body of water such that at least a portion of the upper surface of the cover unit remains above the surface of the body of water, said cover unit further comprising a layer having a plurality of two differently sized openings, the smaller openings being from about 0.5 to about 10 mm in their largest dimension and the larger openings being at least about 10 mm in their largest dimension.

39. A self-floating cover system for reducing offensive gases and/or odors emitted from a body of water, the cover system comprising:

at least one cover unit sized and shaped to cover at least a portion of the body of water, said cover unit being flexible and having an upper surface formed by a filamentary material and capable of supporting growth of aerobic biomass thereon when the cover system is placed onto the surface of the body of water, the buoyancy of said cover unit being greater than the maximum weight of biomass that accumulates on and within said cover unit when the cover system is placed onto the surface of the body of water such that at least a portion of the upper surface of the cover unit remains above the surface of the body of water;

said cover unit further comprising microporous particles which form at least a portion of the upper surface of said cover unit capable of supporting growth of aerobic biomass.

40. A self-floating cover system according to claim 39 further comprising a buoyancy-imparting layer comprising a bouyant material, at least a portion of said microporous particles being on the surface of said buoyancy-imparting layer.

41. A self-floating cover system according to claim 39 further comprising a strength-imparting layer comprising a material having a tensile strength greater than the tensile strength of the buoyancy-imparting layer, at least a portion of said microporous particles being on the surface of said strength-imparting layer.

* * * * *